US012589370B2

(12) United States Patent
Stalder et al.

(10) Patent No.: US 12,589,370 B2
(45) Date of Patent: Mar. 31, 2026

(54) RECEIVING DEVICE FOR RECEIVING A BOTTLE ON A CARBONATION MACHINE, CARBONATION MACHINE, AND METHOD FOR USING A CARBONATION MACHINE

(71) Applicant: SODAPOP GMbH, Bergisch Gladbach (DE)

(72) Inventors: Stefan Stalder, Zollikofen (CH); Günter Empl, Bergisch Gladbach (DE)

(73) Assignee: SODAPOP GmbH, Bergisch Gladbach (DE)

( * ) Notice: Subject to any disclaimer, the term of this patent is extended or adjusted under 35 U.S.C. 154(b) by 353 days.

(21) Appl. No.: 18/268,671

(22) PCT Filed: Dec. 16, 2021

(86) PCT No.: PCT/EP2021/086213
§ 371 (c)(1),
(2) Date: Jun. 21, 2023

(87) PCT Pub. No.: WO2022/136115
PCT Pub. Date: Jun. 30, 2022

(65) Prior Publication Data

US 2024/0033694 A1 Feb. 1, 2024

(30) Foreign Application Priority Data

Dec. 23, 2020 (DE) ......................... 102020216540.8

(51) Int. Cl.
*B01F 23/2361* (2022.01)
*B01F 23/23* (2022.01)
(Continued)

(52) U.S. Cl.
CPC ...... *B01F 23/2361* (2022.01); *B01F 23/2366* (2022.01); *B01F 23/237621* (2022.01); *B01F 35/60* (2022.01); *B01F 2101/14* (2022.01)

(58) Field of Classification Search
CPC .......... B01F 23/2361; B01F 23/237621; B01F 23/2366; B01F 35/60
See application file for complete search history.

(56) References Cited

U.S. PATENT DOCUMENTS 3,953,550 A * 4/1976 Gilbey ..................... C12G 1/06
426/477
4,401,607 A * 8/1983 Child ...................... G01L 19/12
261/DIG. 7
2014/0255574 A1 9/2014 Njaastad et al.

FOREIGN PATENT DOCUMENTS

EP 1905504 A1 4/2008
EP 3040114 B1 3/2019
(Continued)

OTHER PUBLICATIONS

International Search Report and Written Opinion dated May 20, 2022, for international application PCT/EP2021/086213.

*Primary Examiner* — Jason K Niesz
(74) *Attorney, Agent, or Firm* — The Dobrusin Law Firm, P.C.

(57) ABSTRACT

A receiving apparatus for receiving a bottle for a carbonation machine; the receiving apparatus has a securing apparatus for securing the bottle, the securing apparatus has a locking element, the locking element has a guiding means; when the receiving apparatus is moved from the bottle receiving state into the fitting state, the locking element is guided by the guiding means such that the bottle is secured by means of the locking element; the locking element is configured to be pivoted about a locking element axis; the locking element in the bottle receiving state is arranged in a radially outer position; when the receiving apparatus is moved from the bottle receiving state into the fitting state, the locking element is pivoted about the locking element axis from the
(Continued)

radially outer position into a radially inner position, and the radially inner position is configured to secure the bottle.

15 Claims, 10 Drawing Sheets

(51) Int. Cl.

| | |
|---|---|
| ***B01F 23/237*** | (2022.01) |
| ***B01F 35/60*** | (2022.01) |
| *B01F 101/14* | (2022.01) |

(56) References Cited

FOREIGN PATENT DOCUMENTS

| | | | |
|---|---|---|---|
| WO | 2015/021498 | A1 | 2/2015 |
| WO | 2017/200712 | A1 | 11/2017 |

* cited by examiner

RECEIVING DEVICE FOR RECEIVING A BOTTLE ON A CARBONATION MACHINE, CARBONATION MACHINE, AND METHOD FOR USING A CARBONATION MACHINE

CROSS-REFERENCE TO RELATED APPLICATIONS

This application is a US National Stage of PCT/EP2021/086213 filed on Dec. 16, 2021, which claims priority to DE 10 2020 216 540.8 filed Dec. 23, 2020, all of which are hereby incorporated by reference herein for all purposes.

FIELD

The present invention is based on a receiving apparatus for receiving a bottle on a carbonation machine, wherein the receiving apparatus can be moved from a bottle receiving state which is provided to receive the bottle into a fitting state in which the bottle is fitted on the receiving apparatus.

BACKGROUND

Such receiving apparatuses are generally known as a component of carbonation machines which are provided to carbonate a liquid, for example, water. Such carbonation machines are in particular also referred to as drinking water soda machines and are used domestically as household devices by end consumers. The carbonation machines may in principle be used to carbonate different liquids and to prepare various drinks. For the carbonation, the machines typically have a replaceable $CO_2$ cartridge which provides the gas with which the liquid is moved. The liquid which is intended to be carbonized is typically poured into a bottle. The bottle with the liquid is then fitted to the carbonation machine in order to carry out the carbonation.

EP 3 040 114 B1 discloses a carbonation machine for domestic use comprising a carbonation sub-assembly in order to carbonate liquid in a bottle with pressurized gas from a filling container, and a pronged clamp in order to secure the bottle to the carbonation machine.

An important aspect is that the bottle has to be secured in a safe and stable manner to the machine since an increased pressure is applied during the carbonation. In order to safely withstand this pressure and so that the bottle does not become detached from the machine in an undesirable manner, a correspondingly reliable and stable connection between the bottle and the machine has to be produced. At the same time, the connection must be able to be released in a user-friendly and comfortable manner after the carbonation of the liquid and preferably be configured for a high number of carbonation operations over its service life.

SUMMARY

An object of the present invention is to provide a receiving apparatus for receiving a bottle on a carbonation machine which enables a user-friendly and at the same time safe and stable securing of the bottle on the carbonation machine.

This object is achieved with a receiving apparatus according to these teachings. The receiving apparatus according to the invention for receiving a bottle on a carbonation machine has compared with the prior art the advantage that a securing apparatus having a locking element is provided, wherein the locking element has a guiding means. It is advantageously possible for the locking element to be guided by the guiding means thereof when moving the receiving apparatus from the bottle receiving state into the fitting state in such a manner that the bottle is secured by means of the locking element to the receiving apparatus in such a manner that the bottle can no longer escape in a downward direction from the receiving apparatus. Consequently, a user-friendly and at the same time secure fixing of the bottle is enabled. It is also possible for the bottle to still have play in the fitting state and in particular to be able to be moved in a direction parallel with the central axis thereof over a region. In this case, however, the bottle in the fitting state can preferably no longer be removed from the receiving apparatus so that the play of the bottle is limited in particular in a downward direction. It is consequently in particular conceivable for the bottle to be secured in the fitting state by means of the securing apparatus and particularly using the locking element with a play on the receiving apparatus, but no longer to be able to be removed and to be secured against undesirable release from the receiving apparatus.

As a result of the guiding means of the locking element, it is advantageously possible according to the invention for the locking element when the receiving apparatus is moved from the bottle receiving state into the fitting state to be automatically force-guided in a radially inward direction in the direction of the bottle so that the bottle is fixed or secured in such a manner that it can no longer escape downward from the receiving apparatus. A fitting of the bottle on the receiving apparatus can thereby be achieved using the locking element and also safely withstands the high pressure during the carbonation. At the same time, a particularly high level of user comfort can be achieved since the securing of the bottle can take place automatically when the receiving apparatus is moved from the bottle receiving state into the fitting state, in particular without a separate mechanism or actuator (for example, a button) having to be actuated for this purpose. Furthermore, no motorization or the like is required for the fixing and safe securing of the bottle, whereby the susceptibility to failure and the costs can be reduced. Furthermore, the bottle does not according to the invention have to be screwed into the carbonation machine in a cumbersome manner. It is consequently advantageously possible according to the invention to dispense with a screw connection between the bottle and the carbonation machine.

As a result of the fact that the locking element has the guiding means, a particularly high level of stability of the locking element can further be achieved so that the locking element, on the one hand, has a long service-life and, on the other hand, is not susceptible to damage.

According to the invention, it is conceivable for the bottle when the receiving apparatus is moved from the bottle receiving state into the fitting state to carry out a tilting movement, by means of which the bottle is moved from an in particular oblique receiving position (in the bottle receiving state) into an in particular perpendicular preparation position (in the fitting state). According to the invention, it is possible for the securing of the bottle to be carried out by means of the securing apparatus in a particularly preferred manner during the tilting movement of the bottle from the in particular oblique receiving position thereof (in the bottle receiving state) into the in particular perpendicular preparation position thereof. In the preparation position, the bottle preferably still has play within the receiving apparatus. However, the securing apparatus prevents the bottle from being able to leave the receiving apparatus in the preparation position of the bottle.

In the bottle receiving state of the receiving apparatus, the bottle can be received by means of the receiving apparatus of the carbonation machine, in particular can be inserted by a user into the carbonation machine.

According to the invention, it is conceivable for the transfer of the receiving apparatus from the bottle receiving state into the fitting state to be carried out by means of the tilting movement of the bottle. The tilting movement of the bottle may, for example, be carried out by a user who moves the bottle from the receiving position into the preparation position. It is alternatively or additionally possible for the bottle to carry out the tilting movement from the receiving position into the preparation position (in particular after the bottle has been received by means of the receiving apparatus in the carbonation machine) automatically and in particular without an additional application of force by the user by means of gravitational force. It is alternatively or additionally conceivable for the carbonation machine and in particular the receiving apparatus for receiving the bottle to be acted on with a resilient force, wherein the resilient force brings about and/or supports the tilting movement of the bottle (in particular after the bottle has been introduced into the carbonation machine in the bottle receiving state).

According to the present invention, it is conceivable in this instance in the bottle receiving state, in particular when the bottle is received or inserted, for no securing of the bottle to the carbonation machine or to the receiving apparatus for receiving the bottle to yet take place. It is consequently possible in a particularly advantageous manner for the bottle, when the bottle is received in the bottle receiving state, not to have to be secured separately. Consequently, for example, a securing of the bottle in the carbonation machine can be dispensed with. The securing/fixing of the bottle is advantageously carried out only when the receiving apparatus is moved from the bottle receiving state into the fitting state, in particular in an automated manner, which increases the user comfort and facilities operability.

Typically for the intended carbonation of the liquid in the bottle, a secure fixing of the bottle, which can also safely withstand high pressure which occurs during the carbonation without the bottle becoming detached from the carbonation machine is required. According to the invention, it is possible for such a secure fixing of the bottle to be carried out when the receiving apparatus is moved from the bottle receiving state into the fitting state, that is to say, in particular only after the bottle has been received by means of the receiving apparatus in the bottle receiving state. According to the invention, it is possible for such a fixing of the bottle to be carried out in a particularly advantageous manner by means of the securing apparatus and in particular by means of the locking element and the guiding means thereof. When the bottle is received in the carbonation machine in the bottle receiving state, the securing apparatus is preferably in an open state, in which the securing apparatus does not yet fix the bottle. The securing apparatus and in particular the locking element is then, when the receiving apparatus is moved from the bottle receiving state into the fitting state, moved by the guiding means automatically into a securing position in which the locking element secures the bottle, in particular with play, or prevents removal and a release of the bottle from the receiving apparatus.

According to the invention, it is preferably conceivable for the carbonation machine and the receiving apparatus for receiving a bottle on a carbonation machine to be provided for household use.

The bottle is preferably completely or partially made from glass. Alternatively or additionally, it is conceivable for the bottle to have plastics material and/or metal.

Using the receiving apparatus according to the invention for receiving a bottle on a carbonation machine, the bottle can in particular be connected to the carbonation machine in a reversible manner. The bottle can thus preferably be released from the carbonation machine after the carbonation operation has been ended.

The bottle is preferably constructed in such a manner that it withstands an increased internal pressure compared with normal ambient pressure (of approximately 1 bar). For example, it is conceivable for the bottle to be constructed in such manner that it withstands an internal pressure of up to 11 bar, preferably up to 15 bar, more preferably up to 20 bar or up to 25 bar or up to 30 bar, without shattering (at a temperature of 20° C. and an external pressure of 1 bar).

The carbonation machine can preferably be provided with a replaceable gas cartridge, in particular a $CO_2$ cartridge, which provides the gas for carbonation of the liquid. The liquid to be carbonated is preferably poured into the bottle and is in a particularly preferred manner already present in the bottle when the bottle is received in the receiving apparatus.

The liquid which is intended to be carbonated may, for example, be water or a flavored drink.

Advantageous embodiments and developments of the invention can be derived from the description herein and the description with reference to the drawings.

According to a preferred embodiment of the present invention, there is provision for the receiving apparatus to have a counter-guiding means, in particular a counter-guiding means which complements the guiding means, wherein the receiving apparatus is configured in such a manner that, when the receiving apparatus is moved from the bottle receiving state into the fitting state, the locking element is guided by the guiding means and the counter-guiding means in such a manner that the bottle is secured by means of the locking element. The counter-guiding means is in particular part of a counter-guiding element, which is an element or component, which is separate from the locking element, of the receiving apparatus. The counter-guiding element when the receiving apparatus is moved from the bottle receiving state into the fitting state preferably does not also carry out the tilting movement of the bottle and the locking element. The counter-guiding element consequently remains when the receiving apparatus is moved from the bottle receiving state into the fitting state preferably non-movably in a fixed position. When the receiving apparatus is moved from the bottle receiving state into the fitting state, the locking element consequently carries out in particular a relative movement with respect to the counter-guiding element. As a result of the guiding means and the counter-guiding means, the locking element is preferably forced during this relative movement to carry out a locking movement in which it is guided in a radially inward manner and in particular secures the bottle to the receiving apparatus. A particularly advantageous automatic securing of the bottle to the receiving apparatus can thereby be carried out.

According to a preferred embodiment of the present invention, there is provision for the locking element to be able to be pivoted about a locking element axis, wherein the locking element in the bottle receiving state is arranged in a radially outer position, wherein the locking element when the receiving apparatus is moved from the bottle receiving state into the fitting state is pivoted about the locking element axis thereof from the radially outer position thereof into a radially inner position, wherein the radially inner position is preferably provided to secure the bottle. The locking element can consequently preferably be pivoted about a locking element axis and may, in order to fix and/or secure the bottle, carry out a locking movement from a radially outer position into a radially inner position. The locking element axis, about which the locking element can be pivoted, preferably extends through an end region of the locking element. It is particularly conceivable for the locking element to extend from this locking element axis in a curved manner.

According to a preferred embodiment of the present invention, there is provision for the guiding means and in particular the counter-guiding means to be constructed in such a manner that the locking element is pivoted by the guiding means, and in particular the counter-guiding means, when the receiving apparatus is moved from the bottle receiving state into the fitting state from the radially outer position thereof into the radially inner position thereof. When the receiving apparatus is moved from the bottle receiving state into the fitting state, the bottle and at least part of the receiving apparatus carries out a tilting movement, by means of which the bottle is moved from an oblique receiving position into an in particular perpendicular securing position or preparation position. Preferably, the locking element carries out the tilting movement together with the bottle and is in particular also moved by the bottle during the tilting movement thereof. This tilting movement of the locking element advantageously leads to the guiding means being moved by the counter-guiding means in such a manner that the locking element during this tilting movement is forced to carry out an additional locking movement about a locking element axis of the locking element, in particular from a radially outer position into a radially inner position of the locking element. As a result of the locking movement, the locking element is moved in the direction of the bottle and assumes a position in which it contributes to securing the bottle (that is to say, in particular to securing the bottle against the bottle sliding out of the receiving apparatus). The bottle is thereby secured in a particularly advantageous manner automatically when the tiling movement thereof is carried out from the oblique receiving position thereof into the in particular perpendicular preparation position thereof. In particular, the bottle is in this instance secured in such a manner that, even in the event of high pressure during the following carbonation operation, it is not released from the carbonation machine and in particular is not pressed downward out of the receiving apparatus.

According to a preferred embodiment of the present invention, there is provision for the guiding means and/or the counter-guiding means to have a locking means, wherein the locking element can be engaged in the radially inner position thereof and/or in the outer position thereof by the locking means. The locking means may, for example, comprise one or more locking beads in the counter-guiding means, in which a projection, pin and/or stud of the guiding means can be engaged. For example, a first locking bead may be arranged in the counter-guiding means in such a manner that the projection, pin and/or stud of the guiding means engages in the radially outer position of the locking element in this first locking bead and/or a second locking bead may be arranged in the counter-guiding means in such a manner that the projection, pin and/or stud of the guiding means engages in the radially inner position of the locking element in this second locking bead. Other locking means, such as, for example, one or more locking bulges or one or more undercuts are also conceivable. It is conceivable for the guiding means and the counter-guiding means to have mutually complementary locking means so that the locking element can be engaged in the radially inner position thereof, that is to say, in particular in the securing state of the securing apparatus and/or the radially outer position, that is to say, in particular in the open state of the securing device.

According to a preferred embodiment of the present invention, there is provision for the securing apparatus to comprise an additional locking element, wherein the additional locking element has an additional guiding means, wherein the receiving apparatus is configured in such a manner that, when the receiving apparatus is moved from the bottle receiving state into the fitting state, the additional locking element is guided by the additional guiding means thereof in such a manner that the bottle is additionally secured by means of the additional locking element.

According to a preferred embodiment of the present invention, there is provision for the receiving apparatus to have an additional counter-guiding means, in particular an additional counter-guiding means which complements the additional guiding means, wherein the receiving apparatus is configured in such a manner that, when the receiving apparatus is moved from the bottle receiving state into the fitting state, the additional locking element is guided by the additional guiding means and the additional counter-guiding means in such a manner that the bottle is secured by means of the additional locking element. It is preferably conceivable for the additional counter-guiding means to be part of the counter-guiding element which also has the counter-guiding means. Preferably, the counter-guiding element, when the receiving apparatus is moved from the bottle receiving state into the fitting state, does not also carry out the tilting movement of the bottle, the locking element and the additional locking element. When the receiving apparatus is moved from the bottle receiving state into the fitting state, the additional locking element consequently carries out a relative movement with respect to the counter-guiding element. As a result of the additional guiding means and the additional counter-guiding means, the additional locking element during this relative movement is forced to carry out a locking movement, in which it is guided radially inward and in particular secures the bottle in the receiving apparatus.

Alternatively, it is conceivable for the additional counter-guiding means to be part of an additional counter-guiding element which is separate from the counter-guiding element. In this variant of the present invention, the additional counter-guiding element, when the receiving apparatus is moved from the bottle receiving state into the fitting state, also preferably does not carry out the tilting movement of the bottle, the locking element and the additional locking element. When the receiving apparatus is moved from the bottle receiving state into the fitting state, the additional locking element consequently carries out a relative movement with respect to the additional counter-guiding element. As a result of the additional guiding means and the additional counter-guiding means, the additional locking element during this relative movement is forced to carry out a locking movement, in which it is guided radially inward and in particular secures the bottle in the receiving apparatus.

According to one embodiment of the present invention, it is conceivable for the additional guiding means and/or the additional counter-guiding means to have an additional locking means, wherein the additional locking element can be engaged in the radially inner position thereof and/or in the radially outer position thereof by means of the additional locking means. Consequently, it is possible for the additional locking element to be able to be engaged in the radially outer position thereof and/or for the additional locking element to be able to be engaged in the radially inner position thereof. The additional locking means may, for example, comprise in the additional counter-guiding means one or more locking beads, in which an additional projection, additional pin and/or an additional stud of the additional guiding means can be engaged. For example, a first additional locking bead may be arranged in the additional counter-guiding means in such a manner that the additional projection, additional pin and/or additional stud of the additional guiding means engages in the radially outer position of the additional locking element in this first additional locking bead and/or a second additional locking bead is arranged in the additional counter-guiding means in such a manner that the additional projection, additional pin and/or additional stud of the additional guiding means engages in the radially inner position of the additional locking element in this second additional locking bead. Other locking means, such as, for example, one or more locking beads or one or more undercuts, are also conceivable. It is conceivable for the additional guiding means and the additional counter-guiding means to have mutually complementary additional locking means so that the additional locking element can be engaged in the radially inner position thereof, that is to say, in particular in the securing state of the securing apparatus, and/or the radially outer position thereof, that is to say, in particular in the open state of the securing apparatus.

According to a preferred embodiment of the present invention, it is conceivable for the additional locking element to be able to be pivoted about an additional locking element axis, wherein the additional locking element is arranged in the bottle receiving state in a radially outer position, wherein the additional locking element, when the receiving apparatus is moved from the bottle receiving state into the fitting state, is pivoted about the additional locking element axis thereof from the radially outer position thereof into a radially inner position, wherein the radially inner position of the additional locking element is preferably provided to secure the bottle. It is preferably possible for the additional locking element axis of the additional locking element to extend parallel with the locking element axis of the locking element.

It is conceivable for the locking element axis and/or the additional locking element axis to extend parallel with the central axis of the bottle. It is particularly conceivable for the locking element axis and/or the additional locking element axis to be formed both in the bottle receiving state of the receiving apparatus (when the bottle has already been introduced into the receiving apparatus) and in the preparation state of the receiving apparatus parallel with the central axis of the bottle. It is particularly conceivable for the locking element axis and/or the additional locking element axis during the tilting movement of the bottle (during the movement of the receiving apparatus from the bottle receiving state into the fitting state) also to be tilted parallel with the central axis of the bottle.

According to a preferred embodiment of the present invention, there is provision for the additional guiding means and in particular the additional counter-guiding means to be constructed in such a manner that the additional locking element is pivoted by the additional guiding means, and in particular the additional counter-guiding means, when the receiving apparatus is moved from the bottle receiving state into the fitting state out of the radially outer position thereof into the radially inner position thereof. It is preferably possible for the additional locking element, when the receiving apparatus is moved from the bottle receiving state into the fitting state, to carry out a tilting movement together with the bottle, wherein the additional guiding means during this tilting movement is guided by the additional counter-guiding means in such a manner that the additional locking element is pivoted about the additional locking element axis thereof from the radially outer position thereof into the radially inner position thereof and consequently contributes to fixing the bottle and in particular prevents the bottle from being able to escape in a downward direction from the receiving apparatus.

According to one embodiment of the present invention, it is conceivable for the locking element and the additional locking element—when the receiving apparatus is moved from the bottle receiving state into the fitting state—to either both be pivoted in a clockwise direction or both be pivoted in a counter-clockwise direction about the locking element axes thereof. The locking element and the additional locking element consequently pivot in particular with the same rotation direction.

According to an alternative embodiment of the present invention, it is conceivable—when the receiving apparatus is moved from the bottle receiving state into the fitting state—:

- for the locking element to be pivoted in a counter-clockwise direction about the locking element axis thereof and for the additional locking element to be pivoted in a clockwise direction about the additional locking element axis thereof; or
- for the locking element to be pivoted in a clockwise direction about the locking element axis thereof and for the additional locking element to be pivoted in a counter-clockwise direction about the additional locking element axis thereof. The locking element and the additional locking element consequently pivot in particular with opposing rotation directions.

According to one embodiment of the present invention, it is conceivable for the securing apparatus to be formed with precisely two locking elements, in particular the locking element and the additional locking element. According to an alternative embodiment of the present invention, it is conceivable for the securing apparatus—in addition to the locking element and the additional locking element—to have one or more additional locking elements. It is conceivable for the one or more additional locking elements to be constructed in accordance with the locking element. It is conceivable for all the locking elements of the securing apparatus—when the receiving apparatus is moved from the bottle receiving state into the fitting state—to be moved in each case from the radially outer positions thereof into the radially inner positions thereof, wherein the radially inner positions are preferably provided for securing the bottle in the receiving apparatus. It is conceivable—when the receiving apparatus is moved from the bottle receiving state into the fitting state—for all the locking elements to be pivoted with the same rotation direction, that is to say, in particular all in a clockwise direction or all in a counter-clockwise direction. Alternatively, it is conceivable—when the receiving apparatus is moved from the bottle receiving state into the fitting state—for the locking elements to be pivoted partially in a clockwise direction and partially in a counter-clockwise direction.

According to a preferred embodiment of the present invention, there is provision for the bottle in the bottle receiving state of the receiving apparatus to be able to be arranged in an in particular non-perpendicular receiving position on the receiving apparatus, wherein the flange in the fitting state is arranged in an in particular perpendicular preparation position. The in particular non-perpendicular or oblique receiving position or receiving orientation and the in particular perpendicular preparation position or preparation orientation of the bottle relate, for example, to an orientation of the central axis of the bottle relative to an underlying surface on which the carbonation machine is arranged. The bottle is thus arranged in a perpendicular preparation position, for example, perpendicularly to an underlying surface and tilted in a non-perpendicular receiving position in comparison with the perpendicular preparation position.

According to a preferred embodiment of the present invention, there is provision for the bottle, when the receiving apparatus is moved from the bottle receiving state into the fitting state, to carry out a tilting movement from the in particular non-perpendicular receiving position into the in particular perpendicular preparation position. When moving from the bottle receiving state into the fitting state, the receiving apparatus for receiving the bottle is preferably at least partially pivoted or tilted with the bottle in such a manner that the bottle is moved from a non-perpendicular receiving position into a perpendicular preparation position. However, preferably not all elements of the receiving apparatus are also tilted or moved in this case. For example, it is conceivable for a counter-guiding means, additional counter-guiding means and/or counter-guiding element of the receiving apparatus not to be also moved and tilted, but instead to remain immovably in the position thereof on the carbonation machine.

It is alternatively conceivable for the bottle in the fitting state to be arranged in a non-perpendicular preparation position so that the central axis thereof is arranged, for example, in an angled manner with respect to the surface normal of a surface, on which the carbonation machine is arranged. In this instance, it is conceivable for the carbonation to be carried out in a non-perpendicular preparation position of the bottle. Also in this instance, however, the bottle which is fitted to the receiving apparatus is, when moved from the bottle receiving state into the fitting state, preferably tilted or changes the angle thereof with respect to the underlying surface. The bottle and the receiving apparatus which is provided to receive the bottle thereby carries out at least partially a tilting or rotational movement when moved from the bottle receiving state into the fitting state.

According to a preferred embodiment of the present invention, there is provision for the guiding means to have a projection, pin and/or stud, wherein the additional guiding means preferably has an additional projection, additional pin and/or additional stud.

According to a preferred embodiment of the present invention, there is provision for the counter-guiding means to have a rail which is configured to guide the guiding means, in particular a recess and/or indentation, wherein the additional counter-guiding means preferably has an additional rail which is configured to guide the additional guiding means, in particular an additional recess and/or additional indentation. A particularly advantageous automatic fixing of the bottle can thereby be carried out.

Alternatively, it is conceivable for the guiding means to have a rail, in particular a recess and/or indentation, wherein the additional guiding means preferably has an additional rail, in particular an additional recess and/or additional indentation. In this instance, the counter-guiding means preferably has a projection, pin and/or stud which engages in the rail of the guiding means and is guided therein. Preferably, the additional counter-guiding means accordingly has an additional projection, additional pin and/or additional stud which engages in the additional rail of the additional guiding means and is guided therein. Combinations are also conceivable. For example, it is possible for the guiding means to have a projection, pin and/or stud and for the counter-guiding means to have a complementary rail, wherein the additional guiding means has a rail and the additional counter-guiding means has a complementary additional projection, additional pin and/or additional stud.

According to a preferred embodiment of the present invention, there is provision for the locking element to comprise a bracket, in particular having a circular arc region, wherein the locking element in the fitting state secures the bottle by means of the bracket thereof, wherein the additional locking element preferably comprises an additional bracket, in particular having an additional circular arc region, wherein the additional locking element in the fitting state secures the bottle by means of the additional bracket thereof. The brackets can consequently advantageously be guided during the locking movement from the outer side in the direction of the bottle neck and thus fix or secure the bottle to the receiving apparatus, in particular with play. The brackets preferably extend perpendicularly to the central axis of the bottle and/or in such a manner that they can be arranged or grip in a circumferential direction around the bottle neck of the bottle.

According to one embodiment of the present invention, it is in a particularly advantageous manner conceivable for the bottle to have in a circumferential direction a bead in which the locking element and/or the additional locking element, in particular the bracket and/or the additional bracket, can grip. The bead of the bottle is preferably a bead which extends completely circumferentially around the bottle neck of the bottle so that the bottle does not have to be inserted at a predetermined rotation angle in the carbonation machine.

Additionally or alternatively, according to one embodiment of the present invention, it is conceivable for the bottle to have in a circumferential direction a projection and/or bulge which in the fitting state is arranged in particular above the locking element and/or the additional locking element, in particular the bracket and/or the additional bracket. By means of the projection and/or bulge, it is in a particularly advantageous manner possible to prevent the bottle from being able to be pressed downward out of the securing apparatus by means of the pressure produced during the carbonation operation. It is conceivable for the projection and/or bulge to be formed over the complete circumference in a circumferential direction on the bottle neck or alternatively only over a part-region and/or partially. The locking element and preferably the additional locking element grip in the fitting state around the bottle neck, in particular under the projection and/or bulge of the bottle neck. The projection and/or bulge of the bottle neck can consequently in the fitting state rest on the locking element and preferably the additional locking element, whereby, in a particularly advantageous manner, the bottle is prevented from being able to escape downward out of the receiving apparatus. According to one embodiment of the present invention, it is conceivable for the bead to be arranged below the projection and/or bulge of the bottle neck, in a particularly preferred manner directly adjacent to the projection and/or bulge. It is alternatively conceivable for the bottle neck to have only either one such bead or projection and/or bulge.

Alternatively or additionally, it is conceivable for the locking element and preferably the additional locking element to grip in the fitting state around a projection and/or bulge of the bottle neck, wherein the projection and/or bulge of the bottle neck are at least partially surrounded by the locking element and preferably the additional locking element.

According to a preferred embodiment of the present invention, there is provision for the bracket, in particular the circular arc region, to extend over an angular range of at least 45°, preferably at least 90°, in a further preferred manner at least 170°. Preferably, it is conceivable for the additional bracket, in particular the additional circular arc region, to extend over an angular range of at least 45°, preferably at least 90°, in a more preferred manner at least 170°.

According to a preferred embodiment of the present invention, there is provision for the locking element and the guiding means thereof to be constructed in one piece, wherein the additional locking element and the additional guiding means thereof are preferably constructed in one piece. The locking element and the additional locking element are preferably components which are separate from each other.

According to a preferred embodiment of the present invention, there is provision for the locking element to have a plastics material, wherein the additional locking element preferably has a plastics material. It is consequently possible for the locking element and the additional locking element each to be plastics material components. It is conceivable for the locking element and the additional locking element to have additionally or alternatively other materials, for example, one or more metals.

According to a preferred embodiment of the present invention, there is provision for the receiving apparatus to have a covering element, wherein the locking element and/or the additional locking element are preferably arranged behind the covering element, in particular in such a manner that the covering element at least partially conceals the locking element and/or the additional locking element. According to a preferred embodiment of the present invention, there is provision for the bottle to have a collar, in particular a collar which extends around the bottle neck in a circumferential direction completely circumferentially, partially or in portions. When a user guides the bottle, in particular in the bottle receiving state of the receiving apparatus, into the receiving apparatus, the insertion depth of the bottle in the receiving apparatus is in particular limited by the covering element and the collar of the bottle. The bottle can in particular be introduced only until the collar of the bottle, in particular from below, strikes the covering element. As a result of the covering element and the collar of the bottle, consequently, the introduction depth of the bottle in the receiving apparatus can be determined and/or limited. Consequently, the bottle can be arranged for the user in a comfortable and reproducible manner in a receiving position in or on the receiving apparatus.

Another aspect of subject-matter of the present invention is a carbonation machine, comprising a receiving apparatus for receiving a bottle according to an embodiment of the present invention.

According to a preferred embodiment of the present invention, in particular the carbonation machine, there is provision for the carbonation machine to comprise a safety element, in particular a safety door and/or safety disk, wherein the safety element can be arranged in the fitting state in front of the bottle in such a manner that the bottle is arranged using the safety element, in particular completely circumferentially, inside the carbonation machine. The safety element consequently protects the environment of the carbonation machine and in particular a user in the event of accidents. It is, for example, conceivable for the bottle to have damage which the user does not or cannot identify. In this instance, the bottle could shatter or explode during the carbonation as a result of the high pressure. As a result of the fact that the safety element is arranged in front of the bottle during the carbonation, however, it protects the environment and the user. The safety element may, for example, comprise a safety glass and/or another material, such as, for example, a metal and/or a plastics material which withstands a shattering/exploding bottle or provides protection from splinters of the bottle. It is conceivable for the safety element, when the receiving apparatus is moved from the bottle receiving state into the fitting state, to be automatically arranged in front of the bottle, for example, pushed in front of the bottle, or for a user to arrange the safety element in front of the bottle. A closure of the safety element using an actuation element, such as, for example, a button, is also conceivable. For example, the safety element may be a sliding door which automatically closes as a result of the tilting movement of the bottle when the receiving apparatus is moved from the bottle receiving state into the fitting state.

According to a preferred embodiment of the present invention, in particular the carbonation machine, there is provision for the carbonation machine to comprise a sealing means for sealing the bottle with respect to an environment during a carbonation operation, wherein the sealing means, in particular by means of a pressure which is provided by a gas cartridge, seals the bottle with respect to the environment during the carbonation operation. A pneumatic compensation is thereby achieved. The gas cartridge is in particular a gas cartridge which provides the gas for the carbonation of the liquid. It is consequently advantageously possible for the sealing of the bottle with respect to the environment to be carried out by activating an actuation means for starting the carbonation operation, for example, a button or a touchpad. The gas pressure provided by the gas cartridge (during the carbonation) is consequently particularly advantageously also used to seal the bottle externally during carbonation.

According to one embodiment of the present invention, there is provision in the fitting state and in particular during the carbonation for a gas supply means to protrude into the bottle. The gas cartridge is connected to the gas supply means so that via the gas supply means, during the carbonation, the gas of the gas cartridge is introduced into the bottle in order to carbonate the liquid. The gas supply means is in particular guided through a through-opening of the sealing means and thus protrudes into the bottle. The gas pressure provided by the gas cartridge (during the carbonation) is preferably also used to press the sealing means against the bottle and consequently to seal the bottle externally during carbonation. In this manner, via the gas supply means which protrudes into the bottle, an advantageous carbonation of the liquid in the bottle can be carried out.

According to one embodiment of the present invention, it is conceivable for the sealing means to protrude in a radial direction over the bottle neck or the opening region of the bottle so that, when it is pressed against the opening region of the bottle by the pressure provided by the gas cartridge, it reliably seals it externally. The sealing means preferably has an in particular central through-opening for guiding the gas supply means so that the gas supply means protrudes as a result of the sealing means inside the bottle. It is conceivable for the sealing means to be at least partially resilient in order to achieve an advantageous sealing when the sealing means is pressed against the bottle or the opening region of the bottle. In particular, by means of a resilient or partially resilient sealing means, tolerances of the bottle, in particular occurrences of unevenness on the bottle neck, can advantageously be compensated for and a sealing can nonetheless be carried out. The sealing means preferably has silicone. In this case, it is possible, as a result of the pressure with which the sealing means is pressed onto the opening region of the bottle during the carbonation, for the bottle to be fixed during the carbonation and retained in a fixed position. In particular, it is conceivable for a projection and/or bulge of the bottle neck to be pressed against the locking element and/or additional locking element as a result of the pressure applied to the bottle by the sealing means. Consequently, the bottle is clamped by the sealing means and the locking element and/or additional locking element.

According to one embodiment of the present invention, it is conceivable for the carbonation machine to comprise a pressure chamber, wherein the pressure chamber is formed in particular adjacent to the sealing means. As a result of the pressure chamber and the sealing means, consequently, an advantageous automatic sealing of the bottle with respect to the environment can be carried out. In particular, it is possible for the sealing of the bottle with respect to the environment to be carried out automatically as soon as the carbonation operation is started and the gas cartridge is opened. It is advantageously conceivable for the locking element and preferably the additional locking element to fix the bottle in such a manner that, in spite of the excess pressure produced in the pressure chamber (during the carbonation) and/or the pressure which the sealing means applies to the bottle, it remains securely fixed in the carbonation machine and in particular is not pressed downward out of the carbonation machine.

According to one embodiment of the present invention, it is conceivable for the pressure chamber, in particular during the carbonation, to be connected to an inner space of the bottle by means of a gas connection, preferably in such a manner that, during the carbonation, an excess pressure which is provided by the gas cartridge is produced in the pressure chamber, wherein the sealing means is pressed by the excess pressure in the pressure chamber against the bottle, in particular in such a manner that the bottle is sealed with respect to the environment. The gas connection between the inner side of the bottle and the pressure chamber is preferably in the form of a channel, in particular a channel which is formed by the sealing means. As a result of the channel, a gas connection is produced between the inner side of the bottle and the pressure chamber. If, during carbonation as a result of the opening of the gas cartridge, an excess pressure is produced in the bottle, as a result of the gas connection or the channel an excess pressure is also produced in the pressure chamber. The excess pressure in the pressure chamber is therefore produced in a particularly advantageous manner by means of the gas cartridge. This excess pressure in the pressure chamber preferably leads to the sealing means being pressed downward against the bottle, in particular against the opening region of the bottle, which advantageously leads to a sealing of the bottle with respect to the environment.

Another aspect of subject-matter of the present invention is a method for using a carbonation machine according to an embodiment of the present invention, wherein the method comprises the following steps:

- in a first step, the bottle is arranged in the bottle receiving state of the receiving apparatus on the receiving apparatus of the carbonation machine, wherein the bottle has a liquid,
- in a second step, the receiving apparatus is moved out of the bottle receiving state into the fitting state, wherein, during the movement from the bottle receiving state into the fitting state, the locking element is guided by the guiding means thereof in such a manner that the bottle is secured to the receiving apparatus by means of the locking element,
- in a third step, the liquid in the bottle is carbonated.

It is possible for the receiving apparatus to be moved into the bottle receiving state again after the carbonation so that the bottle with the carbonated liquid can be removed.

It is preferably possible for the carbonation of the liquid to be carried out in the third step using a gas cartridge which via a gas supply means, which protrudes inside the bottle, provides a gas, in particular $CO_2$, in order to carbonate the liquid in the bottle. The carbonation may, for example, be started by a user by means of an actuation element, in particular after the receiving apparatus has reached the fitting state and/or the bottle has been moved into the preparation position. For example, a push-button, a switch, a touchpad, an acoustic signal and/or other actuation elements may be considered as an actuation element to start the carbonation. It is alternatively conceivable for the carbonation to start automatically after the fitting state has been reached and/or after a safety element, in particular a safety door and/or safety disk, has been closed.

According to a preferred embodiment of the present invention, in particular the method, there is provision for the securing apparatus to have an additional locking element, wherein the additional locking element has an additional guiding means,

- wherein, in the second step, when the receiving apparatus is moved from the bottle receiving state into the fitting state, the additional locking element is guided by the additional guiding means thereof in such a manner that the bottle is secured by means of the additional locking element. In the second step, the bottle is consequently preferably secured to the receiving apparatus by means of the locking element and the additional locking element together, in particular in such a manner that the bottle can no longer be removed from the receiving apparatus. The bottle may in this instance in the fitting state be secured to the receiving apparatus with play, that is to say, in particular so as to be able to be moved within the receiving apparatus parallel with the central axis thereof (in particular in an upward/downward direction). In the fixing position or preparation position thereof, the bottle may consequently be movable in particular still parallel with the central axis thereof, wherein the bottle is, however, prevented by the securing apparatus from leaving the receiving apparatus. It is conceivable for the bottle—after the user releases the bottle—to move downward within the play thereof as a result of gravitational force until its movement is limited by the securing apparatus, in particular by the locking element and preferably the additional locking element. The bottle consequently remains securely in the carbonation machine in the fitting state. After the user has released the bottle, it is consequently advantageously possible for the bottle to be retained as a result of gravitational force and the securing apparatus in a well-defined position. In particular, the flange of the bottle rests on the locking element and the additional locking element.

According to one embodiment of the present invention, it is conceivable for the bottle in the second step to carry out a tilting movement from an in particular non-perpendicular receiving position, in which the bottle has been arranged in the first step, into an in particular perpendicular preparation position. Preferably, the receiving apparatus for receiving the bottle is at least partially in the second step tilted together with the bottle in such a manner that the bottle is moved from the receiving position into the preparation position. It is preferably possible for the bottle during this tilting movement in the second step to be fixed by means of the locking element and preferably by means of the additional locking element, in particular with play. The tilting movement in the second step particularly results from the fact that the bottle automatically moves from the receiving position into the preparation position as a result of gravitational force. Alternatively or additionally, it is possible for a user to move the bottle from the receiving position into the preparation position. Alternatively or additionally, it is possible for the receiving apparatus to be acted on with a resilient force, in particular in such a manner that the bottle in the second step is automatically moved from the receiving position into the preparation position by means of the resilient force.

According to one embodiment of the present invention, it is conceivable during the carbonation, in the third step by means of the gas cartridge, for an excess pressure to build up in the bottle in order to carbonate the liquid. It is preferably possible, via a gas connection or a channel between the inner space of the bottle and a pressure chamber of the carbonation machine, in particular a pressure chamber of the receiving apparatus, for the excess pressure which has built up in the bottle to be transferred to the pressure chamber. Alternatively, a direct gas connection between the pressure chamber and the gas cartridge (during the carbonation) would also be conceivable. As a result of the excess pressure which has built up in this manner in the pressure chamber, a sealing means which is arranged on the pressure chamber is pressed downward in the direction of the bottle. The bottle is pressed by the sealing means in a downward direction against the locking element which is located in the securing state and in particular the additional locking element, wherein the locking element and in particular the additional locking element limit a movement of the bottle in a downward direction, in particular in such a manner that the bottle cannot be pressed out of the receiving apparatus by the sealing means and/or the excess pressure. It can consequently be ensured in a particularly advantageous manner that the bottle remains in its preparation position or securing position.

For the carbonation machine according to the invention and the method according to the invention for using a carbonation machine, the advantages and embodiments which have already been described above in connection with the receiving apparatus according to the invention for receiving a bottle on a carbonation machine or in connection with an embodiment of the receiving apparatus according to the invention for receiving a bottle on a carbonation machine may be used. For the receiving apparatus according to the invention for receiving a bottle in a carbonation machine and the method according to the invention for using a carbonation machine, the advantages and embodiments which have already been described in connection with the carbonation machine according to the invention or in connection with an embodiment of the carbonation machine according to the invention may be used. For the receiving apparatus according to the invention for receiving a bottle on a carbonation machine and the carbonation machine according to the invention, the advantages and embodiments which have already been described in connection with the method according to the invention for using a carbonation machine or in connection with an embodiment of the method according to the invention for using a carbonation machine may be used.

Other details, features and advantages of the invention will be appreciated from the drawings and from the following description of preferred embodiments with reference to the drawings, The drawings illustrate in this instance purely exemplary embodiments of the invention which do not limit the significant notion of the invention.

DETAILED DESCRIPTION

Figure 1:
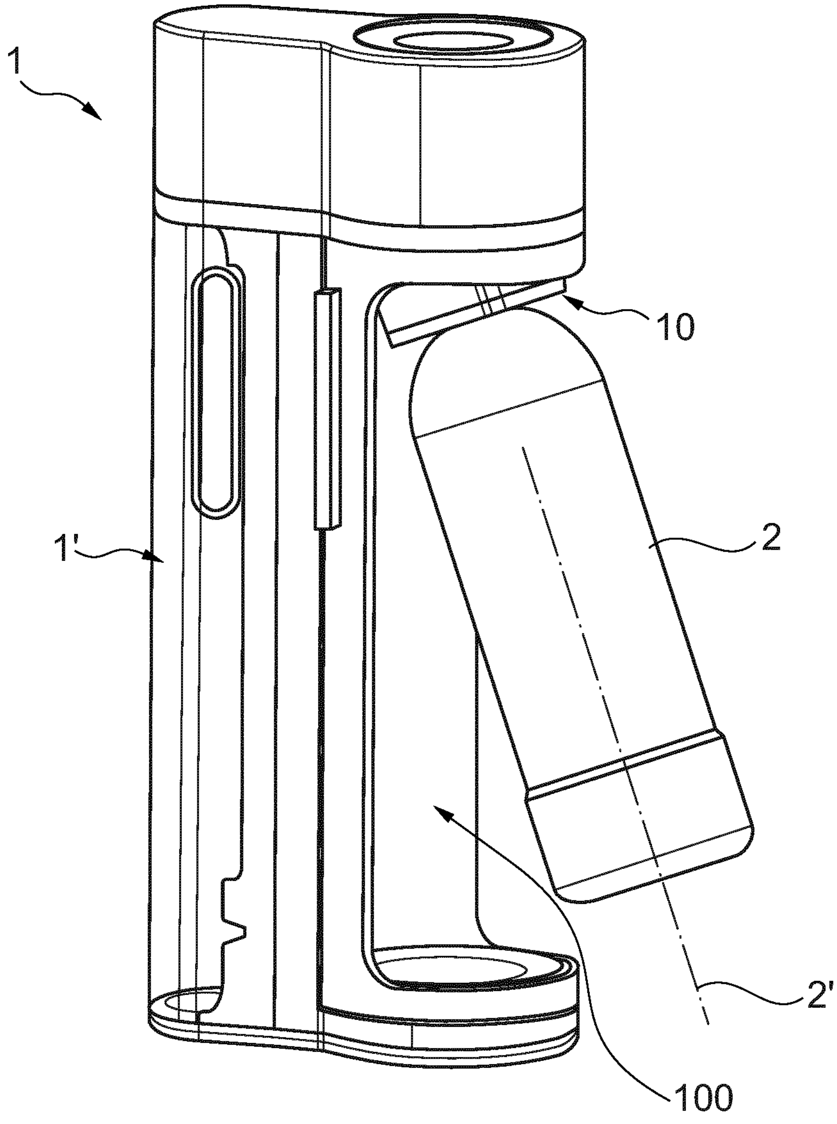
FIGS. 1 and 2 show perspective illustrations of a carbonation machine according to an exemplary embodiment of the present invention.

In the various Figures, identical components are always given the same reference numerals and are therefore generally also only named or mentioned once.

FIG. 1 shows a perspective illustration of a carbonation machine 1 according to an exemplary embodiment of the present invention in a bottle receiving state. The carbonation machine comprises a receiving apparatus 10. In the bottle receiving state of the receiving apparatus 10, the bottle 2 can be arranged in a tilted, non-perpendicular receiving position on the carbonation machine 1. The central axis 2' of the bottle 2 is accordingly not arranged perpendicularly, but instead extends in an oblique manner. As a result of a tilting movement 100, the bottle 2 can be moved out of the receiving position into an in particular perpendicular preparation position.

The tilting movement 100 of the bottle 2 may, for example, be carried out by a user who moves the bottle 2 out of the receiving position into the preparation position, It is alternatively or additionally possible for the bottle 2 to carry out the tilting movement 100 from the receiving position into the preparation position automatically and in particular without additional application of force by the user as a result of gravitational force. It is alternatively or additionally possible for the carbonation machine 1 and in particular the receiving apparatus 10 to be acted on with a resilient force, wherein the resilient force brings about and/or supports the tilting movement 100 of the bottle 2. According to the invention, it is advantageously possible for a portion of the receiving apparatus 10 to carry out the tilting movement 100 together with the bottle 2, wherein the receiving apparatus 10 is moved from the bottle receiving state into the fitting state of the receiving apparatus 10, in which state the bottle 2 is secured to the receiving apparatus 10.

A gas cartridge, which provides the gas for the carbonation of a liquid which is located in the bottle 2, in particular water, can be introduced at the rear side 1' of the carbonation machine 1.

Figure 2:
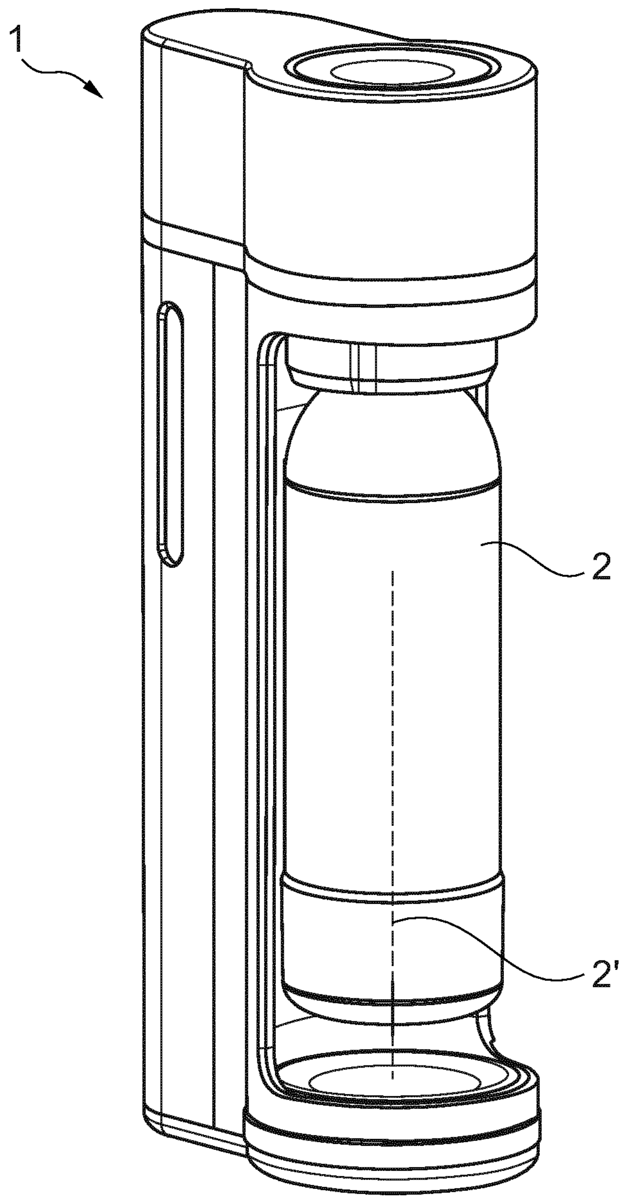

FIG. 2 shows a perspective illustration of the carbonation machine 1 according to FIG. 1 in a fitting state, in particular after the completion of the tilting movement 100. In the fitting state the bottle 2 is in the perpendicular securing position or preparation position so that a carbonation can be carried out.

Figure 3:
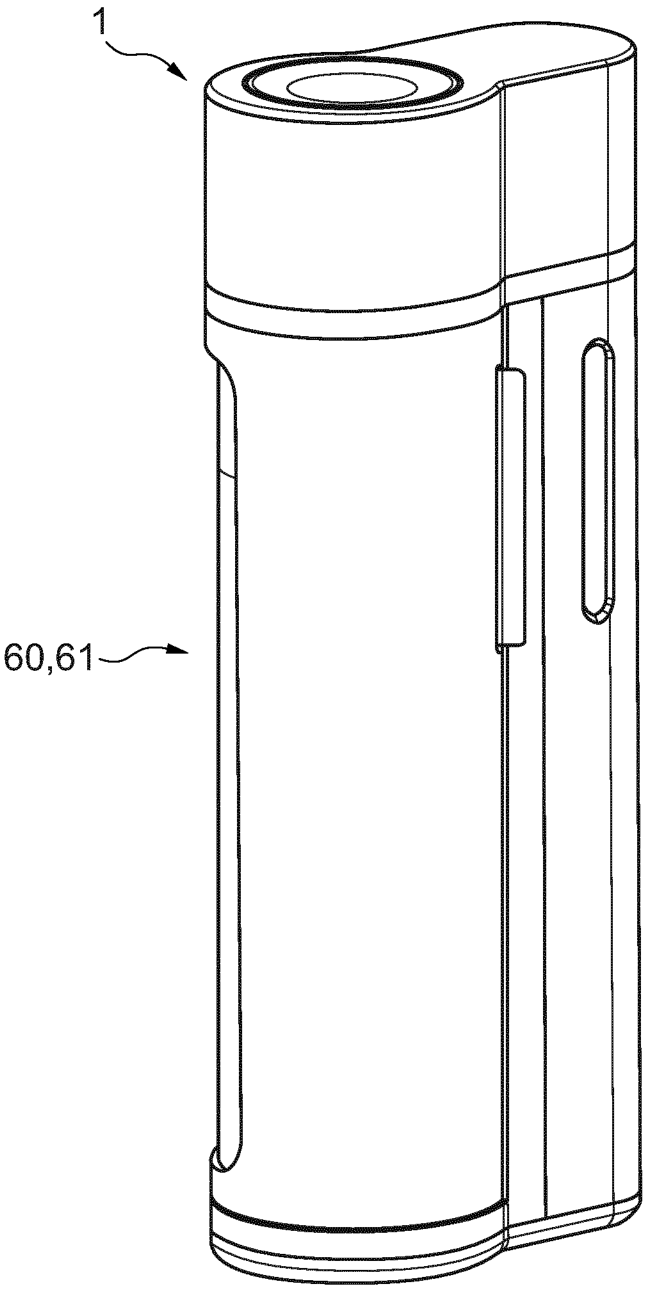
FIG. 3 shows a perspective illustration of a carbonation machine according to an exemplary embodiment of the present invention.

FIG. 3 shows a perspective view of a carbonation machine 1 according to an exemplary embodiment of the present invention. In particular, the fitting state in which a carbonation can be carried out is illustrated. The carbonation machine 1 comprises a safety element 60, in particular a safety door 61. The safety element 60 is in the fitting state arranged in front of the bottle 2 in such a manner that the bottle 2 is arranged completely inside the carbonation machine 1. The safety element 60 consequently protects the user and the environment of the carbonation machine 1, for example, from the bottle 2 shattering. It is possible for the carbonation operation only to be able to be started when the safety element 60 is closed.

Figure 4:
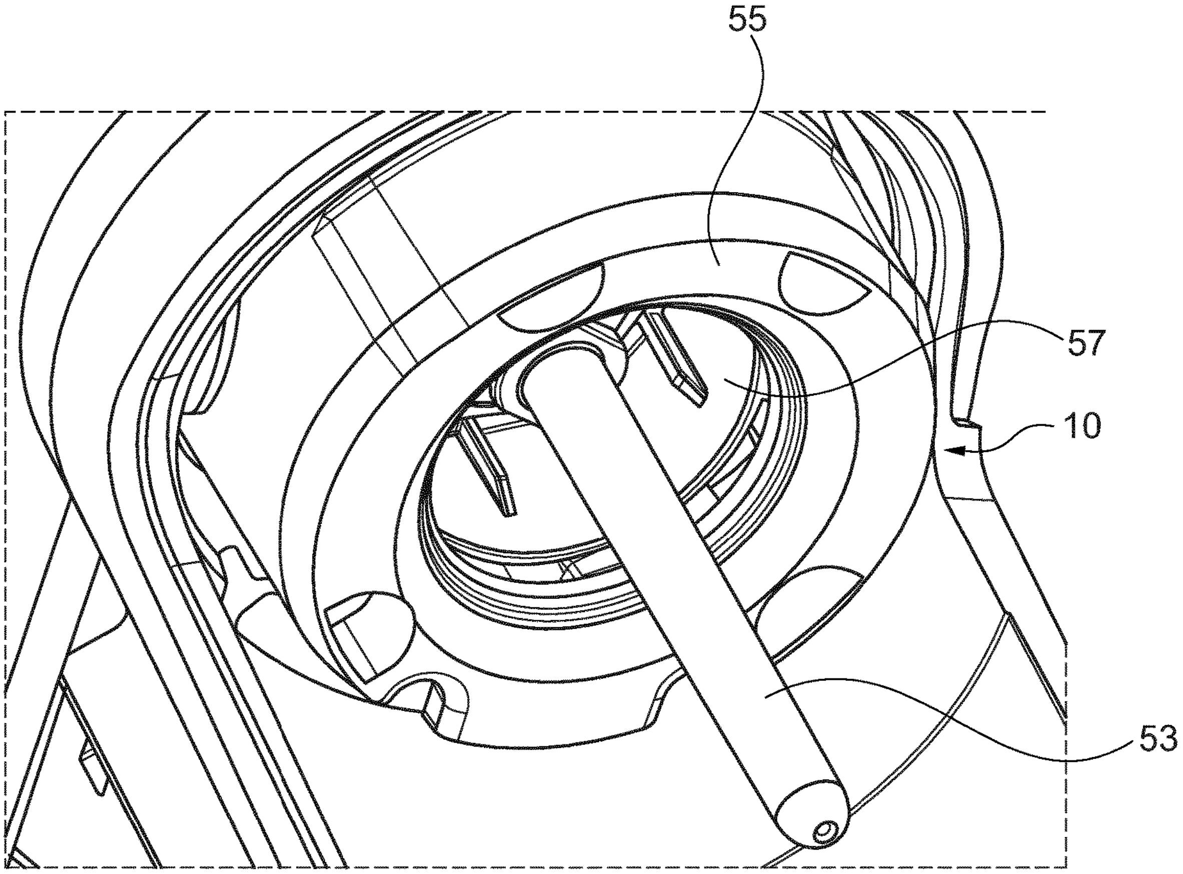
FIG. 4 shows a perspective illustration of a receiving apparatus according to an exemplary embodiment of the present invention.

FIG. 4 shows a perspective illustration of a receiving apparatus 10 and the region of the carbonation machine 1 which surrounds the receiving apparatus 1 according to an exemplary embodiment of the present invention. The carbonation machine 1 comprises a gas supply means 53 which in the fitted state of the bottle 2 protrudes into the bottle 2. The receiving apparatus 10 comprises a covering element 55. The covering element 55 covers the locking element 30 and the additional locking element 40 of the securing apparatus 20. Furthermore, a receiving portion 57 of the receiving apparatus 10 is shown. The receiving portion 57 comprises a recess in which the bottle neck of the bottle 2 can be introduced. The bottle 2 is guided and positioned by the receiving portion 57 when the bottle 2 is introduced into the receiving apparatus 10, which facilitates the introduction operation for the user and increases the user comfort.

Figure 5:
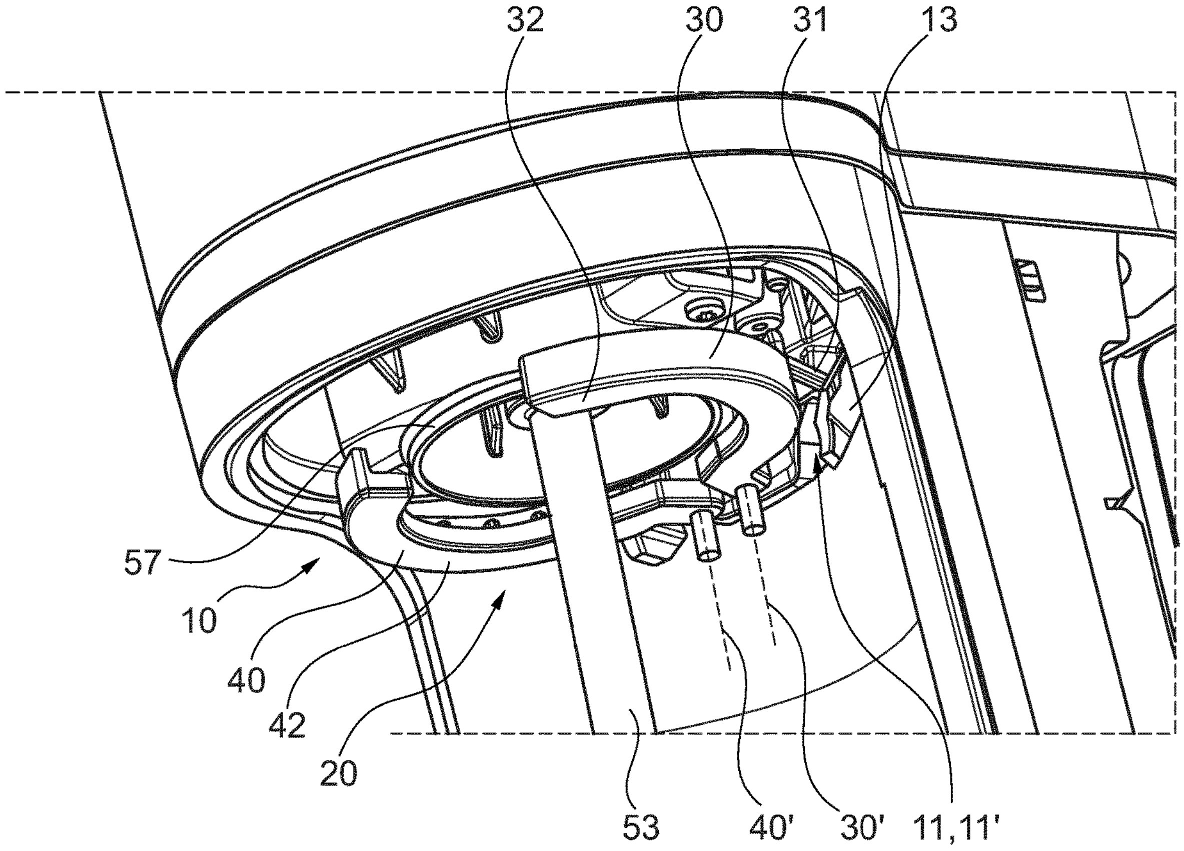
FIGS. 5 and 6 show perspective illustrations of a receiving apparatus according to an exemplary embodiment of the present invention.
Figure 6:
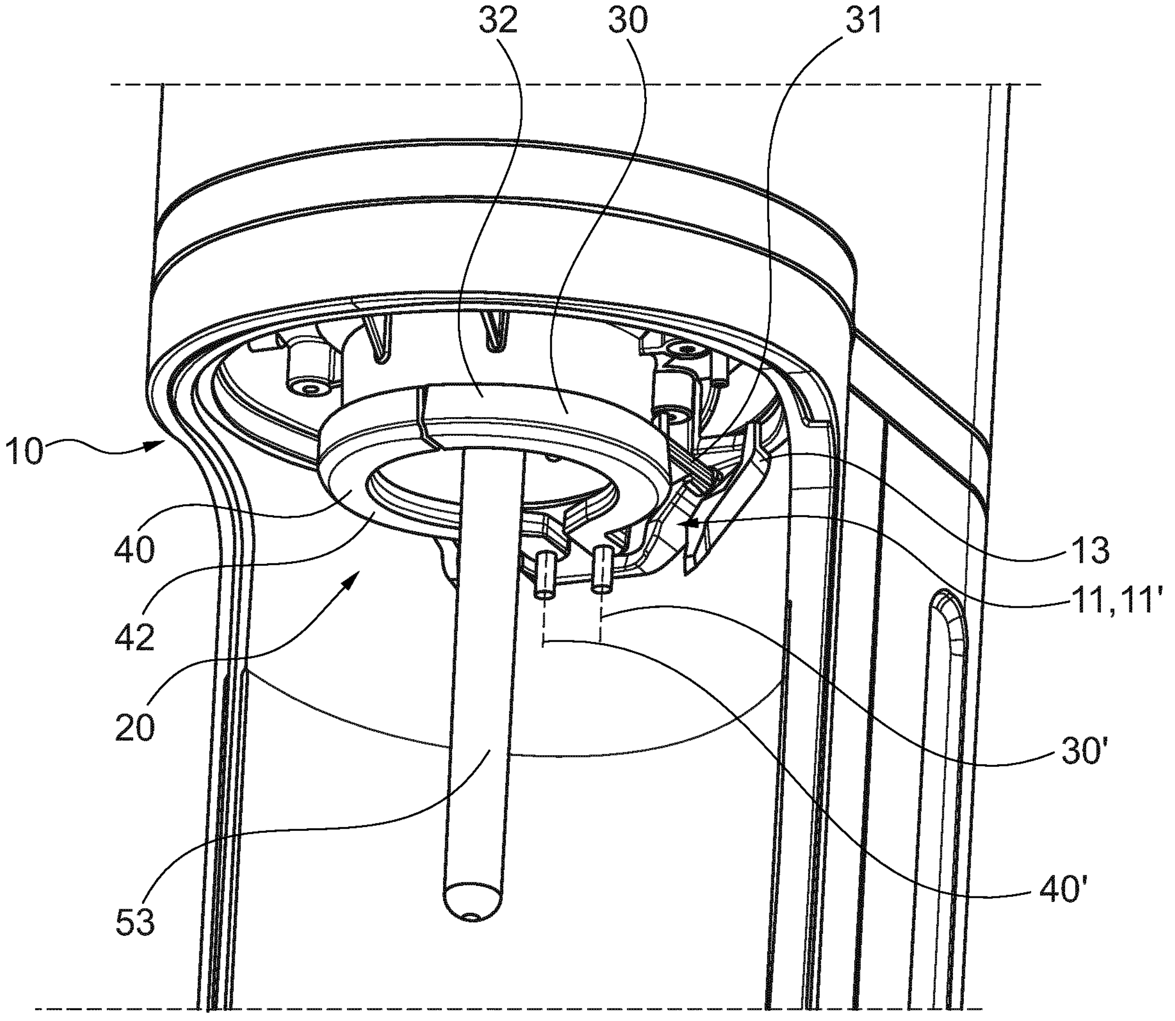

FIG. 5 shows a perspective illustration of a receiving apparatus 10 and the region of the carbonation machine 1 which surrounds the receiving apparatus 10 according to an exemplary embodiment of the present invention. The covering element 55 is concealed in the illustration so that the portions of the securing apparatus 20 located behind can be seen. The securing apparatus 20 comprises a locking element 30 and an additional locking element 40. The locking element 30 and the additional locking element 40 are shown in FIG. 5 in an open state, which they assume in the bottle receiving state of the receiving apparatus 10, so that the bottle 2 can be introduced. The locking element 30 comprises a bracket 32 which has a circular arc region and is constructed to grip in a circumferential direction around the bottle neck of the bottle 2. The additional locking element 40 comprises an additional bracket 42 which has an additional circular arc region and which is also constructed to grip in a circumferential direction around the bottle neck of the bottle 2. The locking element 30 can be pivoted about a locking element axis 30', in particular from a radially outer position which is illustrated in FIG. 5, into a radially inner position which is illustrated in FIG. 6, and which corresponds to a closed state of the securing apparatus 20. The additional locking element 40 can be pivoted about an additional locking element axis 40', in particular from a radially outer position which is illustrated in FIG. 5, and a radially inner position which is illustrated in FIG. 6 and which corresponds to a closed state of the securing apparatus 20.

The receiving apparatus 10 further comprises a counter-guiding element 13. The counter-guiding element 13 comprises a counter-guiding means 11 and an additional counter-guiding means 12. The counter-guiding means 11 is in the form of a rail 11', in particular a recess in the counter-guiding element 13. The pin 31' of the guiding means 31 engages in this rail 11' and is guided by the rail 11'. The additional counter-guiding means 12 is in the form of an additional rail, in particular an additional recess in the counter-guiding element 13. The additional pin 41' of the additional guiding means 41 engages in the additional rail 12' and is guided by the additional rail 12'.

When the receiving apparatus 10 is moved from the bottle receiving state into the fitting state, the counter-guiding element 12 does not also carry out the tilting movement 100 of the bottle 2, but instead remains immovably on the carbonation machine 1. When the receiving apparatus 10 is moved from the bottle receiving state into the fitting state, the locking element and the additional locking element 40 carry out a relative movement relative to the counter-guiding element 13 (and consequently with respect to the counter-guiding means 11 and the additional counter-guiding means 12). As a result of the relative movement, the pin 31' is moved in the rail 11' in particular from the bottom to the top. As a result of the geometric construction of the rail 11', the locking element 30 is in this instance forced to carry out a locking movement 33 in which it is pivoted in a radially inward direction toward the bottle 2. Accordingly, as a result of the relative movement, the additional pin 41' is moved in the additional rail 12' in particular from the bottom to the top. As a result of the construction of the additional rail 12', the additional locking element 40 is in this instance forced to carry out a locking movement in which it is pivoted radially inward toward the bottle 2. When the receiving apparatus 10 is moved from the bottle receiving state into the fitting state, the locking element 30 and the additional locking element 40 are consequently automatically moved by the guiding means 31 and the counter-guiding means 11 or the additional guiding means 41 and the additional counter-guiding means 12 into a securing position in which the locking element 30 and the additional locking element 40 secure the bottle 2 in the receiving apparatus 10, in particular with play 101, and prevent a removal and detachment of the bottle 2 form the receiving apparatus 10.

FIG. 6 shows a perspective illustration of the receiving apparatus 10 shown in FIG. 5, wherein the receiving apparatus 10 is located in the fitting state. The locking element 30 and the additional locking element 40 have accordingly carried out their locking movements and are each located in the radially inner positions thereof, that is to say, in the securing positions thereof. The locking element 30 secures the bottle 2 (not illustrated) in the fitting state by means of the bracket 32 thereof, which engages around the bottle neck in a circumferential direction. The additional locking element 40 secures the bottle 2 (not illustrated) in the fitting state by means of the additional bracket 42 thereof which engages around the bottle neck in the circumferential direction. The bracket 32 extends in the embodiment illustrated over an angular range of slightly less than 180°. Accordingly, the additional bracket 42 extends over an angular range of slightly less than 180°. Together, consequently, the bracket 32 and the additional bracket 42 can in their radially inner position substantially completely surround the bottle neck and prevent the bottle 2 from being pressed out of the receiving apparatus 10 in an undesirable manner during the carbonation.

Figure 7:
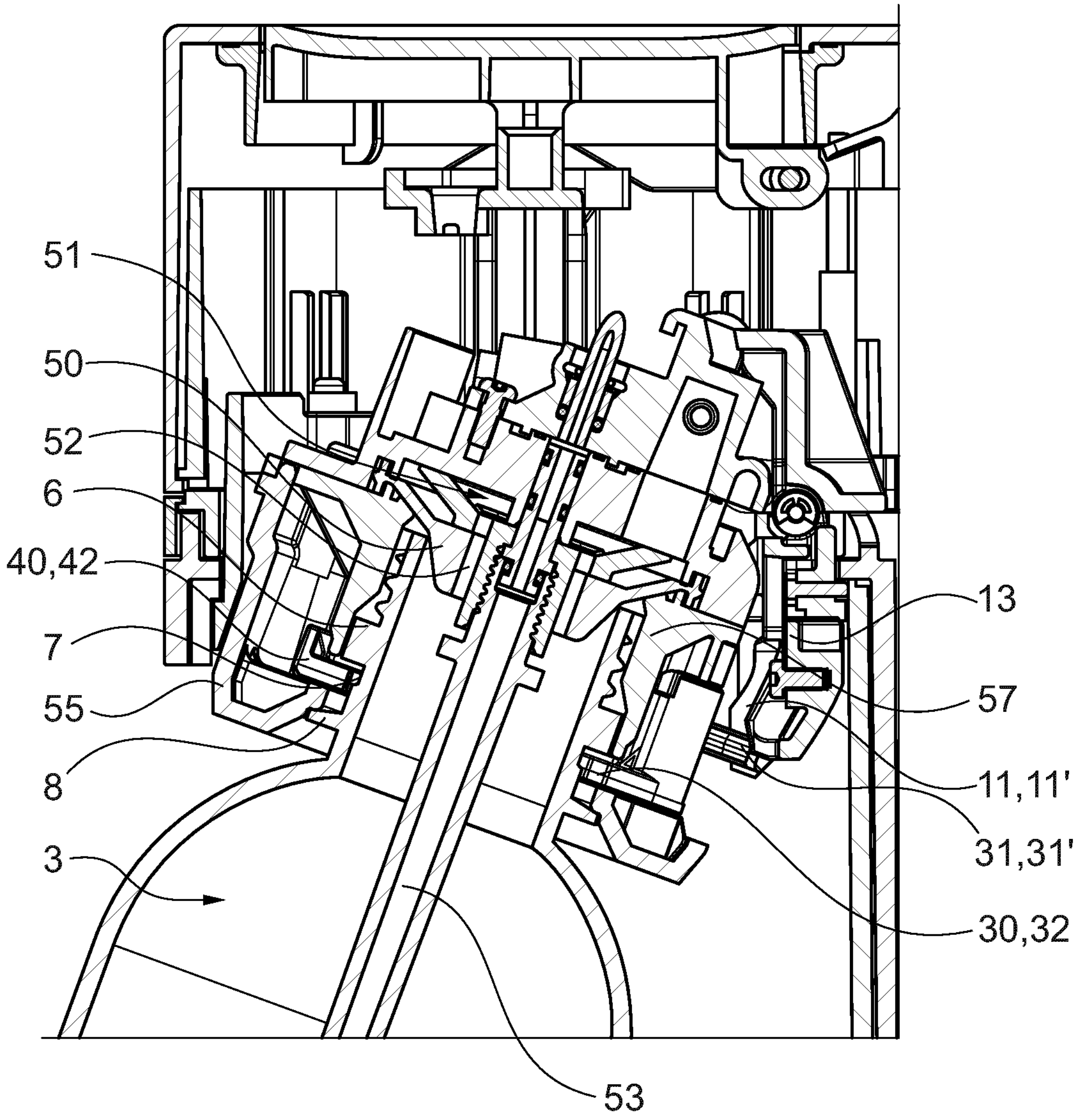
FIGS. 7, 8 and 9 show sectioned illustrations of a receiving apparatus and a bottle according to an exemplary embodiment of the present invention.

FIG. 7 shows a sectioned view of a carbonation machine 1 and a bottle 2 according to an exemplary embodiment of the present invention. The receiving apparatus 10 is located in the bottle receiving state. The bottle 2 is introduced in a tilted, non-perpendicular receiving position into the receiving apparatus 10. The receiving apparatus 10 comprises a receiving portion 57 with a recess, in which the bottle neck of the bottle 2 is partially introduced. As a result of the receiving portion 57, the bottle 2 is guided and positioned when the bottle 2 is introduced into the receiving apparatus 10 which facilitates the introduction operation for the user and increases the user comfort. The user presses the bottle 2 during introduction typically obliquely from below into the receiving apparatus 10 so that the bottle neck is guided into the receiving portion 57. This introduction movement of the bottle 2 as carried out by the user is advantageously limited in an upward direction by a collar 8 of the bottle 2 and the covering element 55 of the receiving apparatus 10. The collar 8 extends around the bottle neck in a circumferential direction completely circumferentially or only partially. The bottle 2 can in particular only be introduced into the receiving apparatus 10 until the collar 8 of the bottle 2 strikes the covering element 55 from below. As a result of the covering element 55 and the collar 8 of the bottle 2, the introduction depth of the bottle in the receiving apparatus 10 is consequently limited. In this manner, the bottle 2 can be arranged for the user in a comfortable and reproducible manner in a receiving position on the receiving apparatus 10. As an alternative to the collar 8, an expansion or protuberance of the bottle 2 which is constructed differently would also be conceivable. The receiving portion 57 and/or the covering portion 55 have an in particular circumferential inclined introduction portion by means of which the bottle 2 when introduced into the receiving apparatus 2 is preferably received, guided and positioned. The inclined introduction member is in particular constructed in such a manner that the diameter, which receives the bottle, of the opening of the receiving portion 57 and/or the covering portion decreases in the introduction direction.

Figure 8:
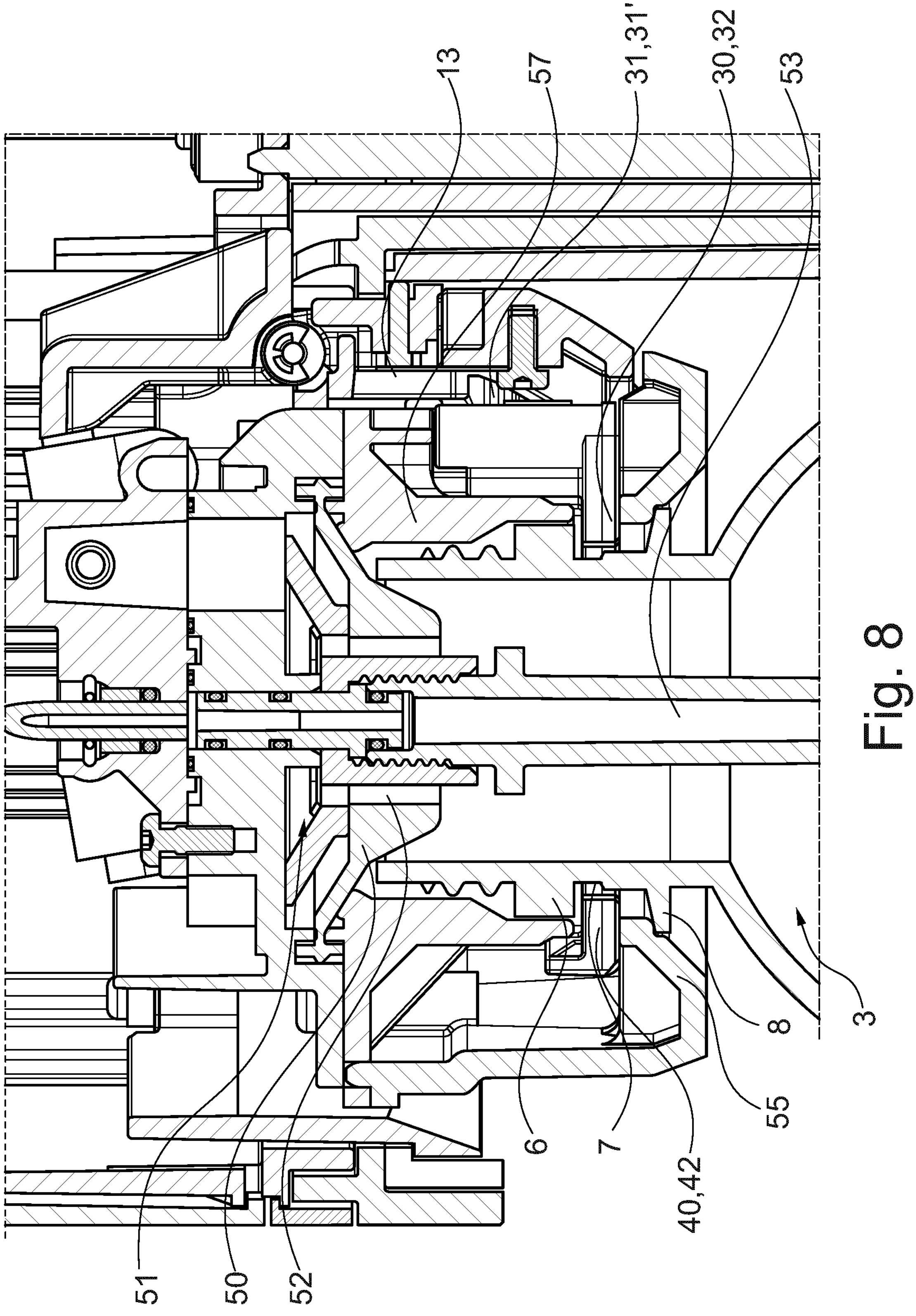

In the bottle receiving state according to FIG. 7, the guiding means 31, in particular the pin 31, of the locking element 30 is arranged as a result of the tilted orientation of the locking element 30 at the bottom in the counter-guiding means 11, in particular the rail 11'. The same applies accordingly to the additional guiding means 41 of the additional locking element 40, which is arranged at the bottom in the additional counter-guiding means 12, in particular the additional rail 12'. When moving from the bottle receiving state (cf. FIG. 7) into the fitting state (cf. FIG. 8), the pin 31' moves in the rail 11 from the bottom to the top. As a result of the construction of the rail 11', the locking element 30 is in this instance forced to carry out a locking movement, in which it is pivoted radially inward toward the bottle 2. Accordingly, as a result of the relative movement, the additional pin 41' in the additional rail 12' is moved from the bottom to the top, whereby the additional locking element 40 is also forced to carry out a locking movement in which it is pivoted radially inward toward the bottle 2. The locking element 30 and the additional locking element 40 are consequently, when the receiving apparatus 10 is moved from the bottle receiving state into the fitting state, automatically moved by the guiding means 31 and the counter-guiding means 11 or by the additional guiding means 41 and the additional counter-guiding means 12 into a securing position, in which the locking element 30 and the additional locking element 40 secure the bottle 2 in the receiving apparatus 10 and prevent a removal and a detachment of the bottle 2 from the receiving apparatus 10. The corresponding fitting state of the receiving apparatus 10 is illustrated in FIG. 8. The bottle 2 and the portions of the receiving apparatus 2, which are movable during the tilting movement, have in this instance been moved into a perpendicular position. FIG. 8 shows a state in which the user still retains the bottle 2 and where applicable presses it upward. A contact between the collar 8 and the covering element 55 is thereby further formed.

Figure 9:
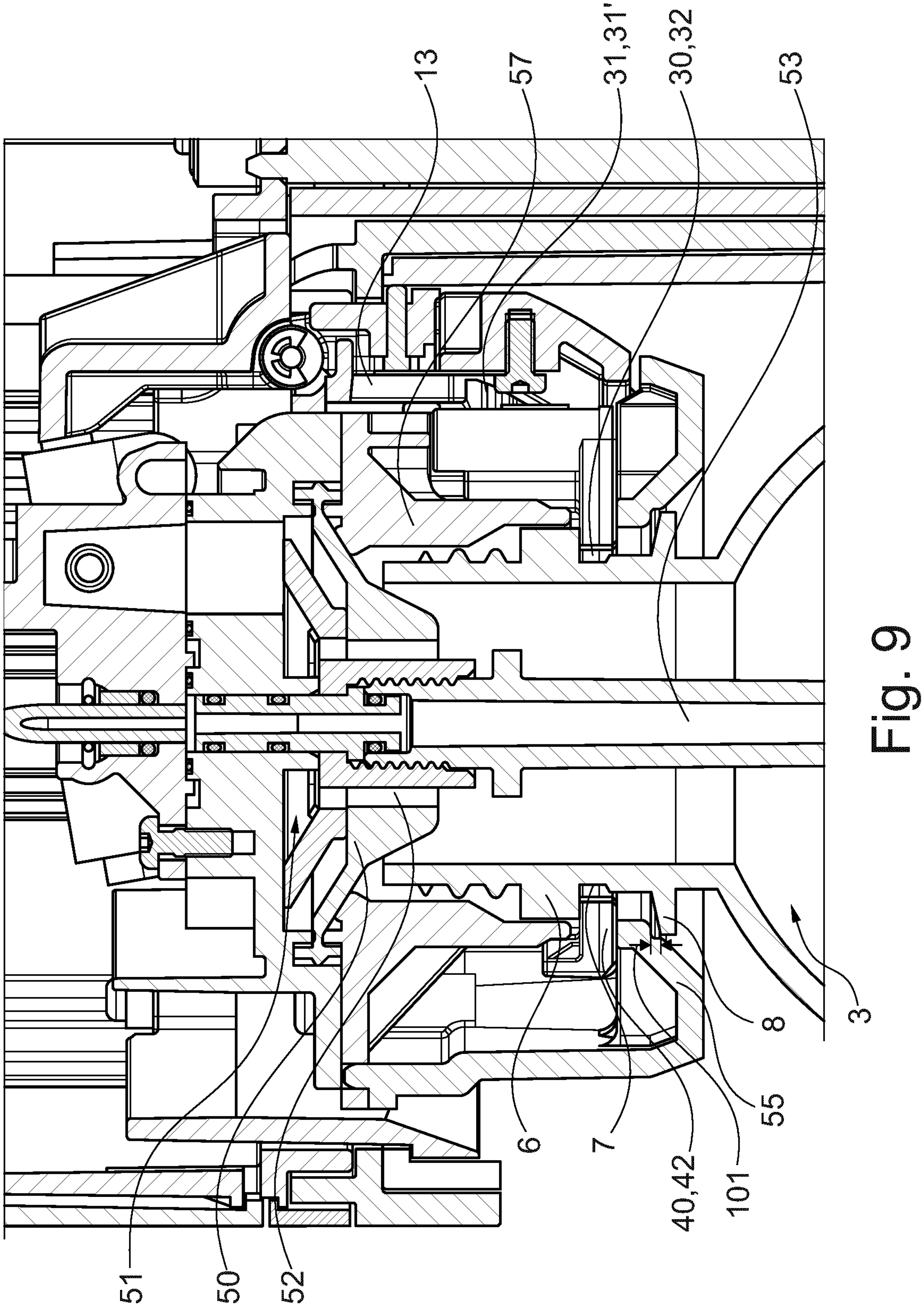

FIG. 9 shows a fitting state after the user has released the bottle 2. The bottle 2 moves within the play 101 which it has in the fitting state in a downward direction until a projection 6 of the bottle 2 rests on the locking elements 30, 40 which are located in the securing position. Consequently, it is possible for the collar 8 no longer to touch the covering element and to be spaced apart therefrom. The spacing between the collar 8 and the covering element 55 is in this instance particularly dependent on the size of the play 101 which the bottle 2 has in the perpendicular securing position thereof in the fitting state. The projection 6 on the bottle neck has in the illustrated embodiment a rectangular cross section and extends from the bottle neck in an outward direction. Other shapes and configurations, in particular other cross sectional geometries, are also conceivable for the projection 6. It is preferably possible for the projection 6 to be constructed in a circumferential direction completely circumferentially around the bottle neck. Alternatively, it is conceivable for the projection 6 to be constructed only partially, in particular with interruptions in a circumferential direction. As a result of the projection 6 and the locking element 30 and the additional locking element the bottle is secured to the receiving apparatus in such a manner that the bottle 2 cannot leave the receiving apparatus 10 in the fitting state so that a safe carbonation can be carried out. As a result of the bracket-shaped locking elements 30, 40 and the circular arc portions thereof, a particularly large contact region between the projection 6 and the locking elements is formed, which leads to a particularly advantageous mechanical stability.

It is possible for the bottle 2 to have a bead 7, in particular a bead 7 which is formed completely circumferentially in a circumferential direction around the bottle neck. The bead 7 is arranged below the projection 6, It is possible for the locking element 30 and the additional locking element 40 to be able to be arranged in the region of the bead 7 around the bottle neck in order to lock the bottle neck.

In order to carbonate the liquid located in the bottle 2, a gas supply means 53 protrudes form above into the bottle 2. Via the gas supply means 53, $CO_2$ from a gas cartridge can reach the bottle 2 during the carbonation. An excess pressure is thereby formed in the inner space 3 of the bottle 2. Via a gas connection 52, the inner space 3 of the bottle 2 is connected to a pressure chamber 51. The gas connection 52 is guided by a sealing means 50 which is provided in order to seal the bottle 2 during the carbonation. Via the gas connection 52, excess pressure which builds up during the carbonation in the inner space 3 of the bottle 2 is transmitted to the pressure chamber 51 so that an excess pressure is also produced in the pressure chamber 51. This excess pressure in the pressure chamber 51 presses the sealing means 50 in a downward direction onto the opening region of the bottle 2. The projection 6 of the bottle 2 is thereby securely pressed onto the locking element 30 and the additional locking element 40 and the bottle 2 is securely fixed. The sealing means 50 can, for example, be produced by means of silicone.

FIGS. 8 and 9 consequently illustrate the play 101 which the bottle 2 may have in the securing position, in particular outside the carbonation operation.

Figure 10:
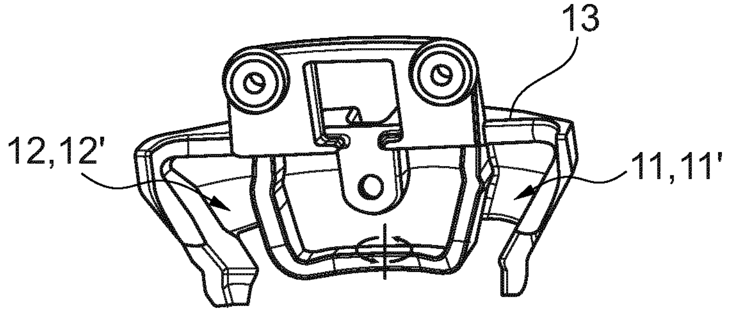
FIG. 10 shows an illustration of a counter-guiding element according to an embodiment of the present invention.

FIG. 10 shows a perspective illustration of a counter-guiding element 13 according to an embodiment of the present invention. The counter-guiding element 13 comprises a counter-guiding means 11 and an additional counter-guiding means 12 which are in the form of a rail 11' and additional rail 12'.

Figure 11:
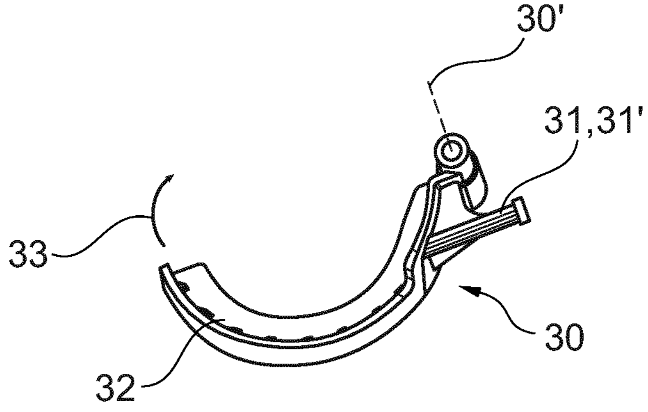
FIG. 11 shows an illustration of a locking element according to an embodiment of the present invention.

FIG. 11 shows a perspective illustration of a locking element 30 according to an embodiment of the present invention. The locking element 30 comprises a bracket 32 with a circular arc form so that the bracket 32 can be arranged in a circumferential direction around a bottle neck. Furthermore, the locking element 30 comprises a guiding means 31 which is in the form of a pin 31'. The guiding means 31 is preferably constructed in an integral manner with the remaining locking element 30, whereby a high level of stability can be achieved. The locking element 30 can be pivoted about a locking element axis 30' and can thus carry out a locking movement from a radially outer position into a radially inner position which is indicated by the arrow 33. Via the pin 31', the locking element 30 can be guided in the rail 11' of the counter-guiding element 13.

Figure 12:
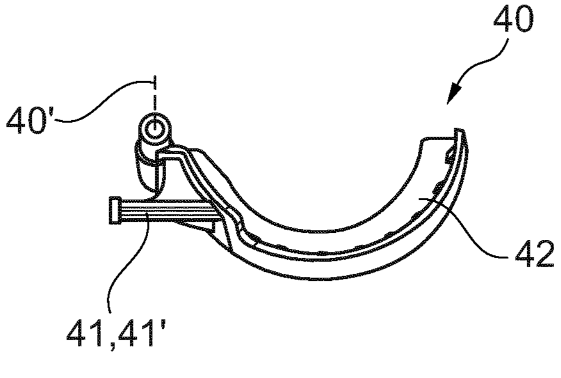
FIG. 12 shows an illustration of another locking element according to an embodiment of the present invention.

FIG. 12 shows a perspective illustration of another locking element 40 according to an embodiment of the present invention. The additional locking element 40 is preferably formed in a reflected manner with respect to the locking element 30. The additional locking element comprises an additional bracket 42 with a circular arc form so that the additional bracket 42 can be arranged in a circumferential direction around a bottle neck. Furthermore, the additional locking element 40 comprises an additional guiding means 41 which is in the form of an additional pin 41'. The additional guiding means 41 is preferably constructed integrally with the remaining additional locking element 40, whereby a high level of stability can be achieved. The additional locking element 40 can be pivoted about an additional locking element axis 40' and can thus carry out a locking movement from a radially outer position into a radially inner position. Via the additional pin 41', the additional locking element 40 can be guided in the additional rail 12' of the counter-guiding element 13.

The counter-guiding element 13, the locking element 30 and the additional locking element 40 are, for example, plastics material components. However, materials other than plastics material can also additionally or alternatively be considered.

LIST OF REFERENCE NUMERALS

1 Carbonation machine
1' Rear side of the carbonation machine
2 Bottle
2' Axis of the bottle
3 Inner space of the bottle
6 Projection
7 Bead
8 Collar
10 Receiving apparatus
11 Counter-guiding means
11' Rail
12 Additional counter-guiding means
12' Additional rail
13 Counter-guiding element
20 Securing apparatus
30 Locking element
30' Locking element axis
31 Guiding means
31' Pin
32 Bracket
33 Locking movement
40 Additional locking element
40' Additional locking element axis
41 Additional guiding means
41' Additional pin
42 Additional bracket
50 Sealing means
51 Pressure chamber
52 Gas connection
53 Gas supply means
55 Covering element
57 Receiving portion
60 Safety element
61 Safety door
100 Tilting movement
101 Play

The invention claimed is:

1. A receiving apparatus for receiving a bottle for a carbonation machine, wherein the receiving apparatus is configured to be moved from a bottle receiving state, which is provided to receive the bottle, into a fitting state in which the bottle is fitted on the receiving apparatus; wherein the receiving apparatus comprises a securing apparatus for securing the bottle, the securing apparatus comprises a locking element, the locking element has a guiding means; wherein when the receiving apparatus is moved from the bottle receiving state into the fitting state, the locking element is guided by the guiding means such that the bottle is secured by means of the locking element; wherein the locking element is configured to be pivoted about a locking element axis;

wherein the locking element in the bottle receiving state is arranged in a radially outer position;

wherein when the receiving apparatus is moved from the bottle receiving state into the fitting state, the locking element is pivoted about the locking element axis from the radially outer position into a radially inner position, and wherein the radially inner position is configured to secure the bottle.

2. The receiving apparatus as claimed in claim 1, wherein the receiving apparatus has a counter-guiding means, which complements the guiding means, wherein the receiving apparatus is configured such that when the receiving apparatus is moved from the bottle receiving state into the fitting state, the locking element is guided by the guiding means and the counter-guiding means such that the bottle is secured by means of the locking element.

3. The receiving apparatus as claimed in claim 1, wherein the locking element is pivoted by the guiding means and the counter-guiding means when the receiving apparatus is moved from the bottle receiving state into the fitting state from the radially outer position thereof into the radially inner position thereof.

4. The receiving apparatus as claimed in claim 1, wherein the locking element comprises a bracket having a circular arc region, wherein the locking element in the fitting state secures the bottle by the bracket, wherein the additional locking element comprises an additional bracket having an additional circular arc region, wherein the additional locking element in the fitting state secures the bottle by means of the additional bracket thereof.

5. A carbonation machine comprising a receiving apparatus for receiving a bottle as claimed in claim 1.

6. The carbonation machine as claimed in claim 5, wherein the carbonation machine comprises a safety element comprising a safety door and/or safety disk, wherein the safety element can be arranged in the fitting state in front of the bottle in such a manner that the bottle is arranged using the safety element completely circumferentially inside the carbonation machine.

7. The carbonation machine as claimed in claim 5, wherein the carbonation machine comprises a sealing means for sealing the bottle with respect to an environment during a carbonation operation, wherein the sealing means, by means of a pressure which is provided by a gas cartridge, seals the bottle with respect to the environment during the carbonation operation.

8. A method for using a carbonation machine as claimed in claim 5, wherein the method comprises:

in a first step, the bottle is arranged in the bottle receiving state of the receiving apparatus on the receiving apparatus of the carbonation machine, wherein the bottle has a liquid;

in a second step, the receiving apparatus is moved out of the bottle receiving state into the fitting state, wherein, during the movement from the bottle receiving state into the fitting state, the locking element is guided by the guiding means thereof in such a manner that the bottle is secured to the receiving apparatus by means of the locking element; and in a third step, the liquid in the bottle is carbonated.

9. The receiving apparatus as claimed in claim 1, wherein the securing apparatus comprises an additional locking element, the additional locking element has an additional guiding means; wherein the receiving apparatus is configured such that, when the receiving apparatus is moved from the bottle receiving state into the fitting state, the additional locking element is guided by the additional guiding means thereof in such a manner that the bottle is additionally secured by means of the additional locking element.

10. The receiving apparatus as claimed in claim 9, wherein the locking element and the guiding means are constructed in one piece, wherein the additional locking element and the additional guiding means are constructed in one piece.

11. The receiving apparatus as claimed in claim 9, wherein the locking element has a plastics material, wherein the additional locking element has a plastics material.

12. The receiving apparatus as claimed in claim 9, wherein the receiving apparatus has an additional counter-guiding means, which complements the additional guiding means, wherein the receiving apparatus is configured in such a manner that, when the receiving apparatus is moved from the bottle receiving state into the fitting state, the additional locking element is guided by the additional guiding means and the additional counter-guiding means in such a manner that the bottle is secured by means of the additional locking element.

13. The receiving apparatus as claimed in claim 12, wherein the counter-guiding means has a rail which is configured to guide the guiding means, wherein the additional counter-guiding means has an additional rail which is configured to guide the additional guiding means.

14. The receiving apparatus as claimed in claim 9, wherein the additional locking element can be pivoted about an additional locking element axis, wherein the additional locking element is arranged in the bottle receiving state in a radially outer position, wherein the additional locking element, when the receiving apparatus is moved from the bottle receiving state into the fitting state, is pivoted about the additional locking element axis thereof from the radially outer position thereof into a radially inner position, wherein the radially inner position of the additional locking element is provided to secure the bottle.

15. The receiving apparatus as claimed in claim 14, wherein the additional guiding means and the additional counter-guiding means are constructed in such a manner that the additional locking element is pivoted by the additional guiding means, and the additional counter-guiding means, when the receiving apparatus is moved from the bottle receiving state into the fitting state out of the radially outer position thereof into the radially inner position thereof.

* * * * *